United States Patent [19]

Takeshita et al.

[11] Patent Number: 4,674,600

[45] Date of Patent: Jun. 23, 1987

[54] LUBRICATION ARRANGEMENT IN CHANGE-SPEED GEARING ASSEMBLY

[75] Inventors: Keiji Takeshita; Hideo Hamano; Shoichi Ohshima; Takaaki Suzuki; Shuichiro Ida, all of Toyota, Japan

[73] Assignee: Toyota Jidosha Kabushiki Kaisha, Aichi, Japan

[21] Appl. No.: 684,579

[22] Filed: Dec. 21, 1984

[30] Foreign Application Priority Data

Dec. 28, 1983 [JP] Japan .................. 58-199673[U]

[51] Int. Cl.⁴ ............................................. F01M 9/06
[52] U.S. Cl. ................................. 184/6.12; 184/11.2
[58] Field of Search .................. 184/13.1, 11.1, 11.2, 184/11.3, 6.12; 74/467, 468

[56] References Cited

U.S. PATENT DOCUMENTS

| | | | |
|---|---|---|---|
| 1,014,628 | 1/1912 | Lieber | 184/11.2 |
| 1,290,626 | 1/1919 | Masury | 184/13.1 X |
| 4,287,783 | 9/1981 | Ida et al. | 184/6.12 X |
| 4,327,598 | 5/1982 | Yoneda et al. | 184/11.1 X |
| 4,359,909 | 11/1982 | Sogo | 184/6.12 X |

FOREIGN PATENT DOCUMENTS

| | | | |
|---|---|---|---|
| 23158 | 2/1984 | Japan | 74/467 |
| 2042650 | 9/1980 | United Kingdom | 74/467 |

*Primary Examiner*—Leonard E. Smith
*Attorney, Agent, or Firm*—Parkhurst & Oliff

[57] ABSTRACT

A change-speed gearing assembly including upper and lower bearings carried on a partition wall of a casing for the assembly respectively for supporting thereon input and counter shafts, and a bearing retainer secured in a fluid-tight manner to the outside face of the partition wall to retain both the bearings in place. The input shaft extends outwardly through an annular seal member carried on the upper portion of the bearing retainer coaxially with the upper bearing. The bearing retainer is formed with upper and lower cavities and is formed at one side thereof with a vertical groove which opens at its upper end into a side portion of the upper cavity located above the lower edge of the seal member and at its lower end into the upper portion of the lower cavity to maintain the level of lubricating oil in the upper cavity above the lower edge of the seal member.

4 Claims, 4 Drawing Figures

LUBRICATION ARRANGEMENT IN CHANGE-SPEED GEARING ASSEMBLY

BACKGROUND OF THE INVENTION

The present invention relates generally to a change-speed gearing assembly for motor vehicles, and more particularly to a lubrication arrangement in the change-speed gearing assembly.

As is illustrated in FIG. 4, a conventional change-speed gearing assembly comprises a casing 1 formed with an upright partition wall, a pair of bearings 3 and 5 carried on the upper and lower portions of the partition wall respectively for rotatably supporting thereon upper and lower shafts 6 and 7, and a bearing retainer 2 secured in a fluid-tight manner to the outside face of the partition wall to retain both the bearings 3 and 5 in place. The bearing retainer 2 is formed therein with upper and lower cavities $R_1$ and $R_2$, in which the outside portions of the bearings 3, 5 are exposed respectively, and is formed with a vertical groove P for communication between the upper and lower cavities $R_1$ and $R_2$. The upper shaft extends outwardly through an annular oil seal member 4 carried on the bearing retainer 2 coaxially with the upper bearing 3 and exposed at its inside face to the interior of the upper cavity $R_1$. In operation of the change-speed gearing assembly, an amount of lubricating oil stored in the casing is picked up by rotation of gears mounted on the shafts 6, 7 and in mesh with each other. A portion of the picked up lubricating oil is fed into the upper cavity $R_1$ through an axial hole in the partition wall to lubricate the oil seal member 4 and the upper bearing 3 and returns into the casing 1 across bearing 3. The remaining portion of the lubricating oil flows into the lower cavity $R_2$ through the vertical groove P to lubricate the lower bearing 5 and returns into the casing across bearing 5.

In such a lubrication arrangement in the change-speed gearing assembly, the vertical groove P is positioned on a vertical line between the upper and lower shafts 6 and 7. For this reason, in the case that the quantity of lubricating oil fed into the upper annular cavity $R_1$ becomes small during low speed rotation of the gears or a sealed bearing is utilized as the upper bearing 3 to store an amount of lubricating oil in the upper cavity, lubrication of the oil seal member will be insufficient because the vertical groove P permits therethrough a flow of lubricating oil into the lower cavity $R_2$. This causes fatigue of the oil seal member 4 in a short period of time, resulting in leakage of the oil across the seal member.

SUMMARY OF THE INVENTION

It is, therefore, a primary object of the present invention to provide an improved lubrication arrangement in the change-speed gearing assembly capable of effecting sufficient lubrication of the oil seal member during low speed rotation of the gears to enhance durability of the seal member.

According to the present invention, there is provided a lubrication arrangement in the above-described change-speed gearing assembly, wherein the bottom portion of the upper cavity is separated from the upper portion of the lower cavity, and wherein the vertical groove is formed at one side of the bearing retainer and opens at its upper end into a portion of the upper cavity located above the lower edge of the seal member and at its lower end into the upper portion of the lower cavity.

In operation of the change-speed gearing assembly, the level of lubricating oil fed into the upper cavity is constantly maintained above the lower edge of the seal member to effect sufficient lubrication of the seal member during low speed rotation of the gears.

BRIEF DESCRIPTION OF THE DRAWINGS

Additional objects and advantages of the present invention will become more readily apparent from the following detailed description of the preferred embodiment thereof when taken together with the attached drawings, in which.

DETAILED DESCRIPTION OF THE PREFERRED EMBODIMENT

Figure 1:
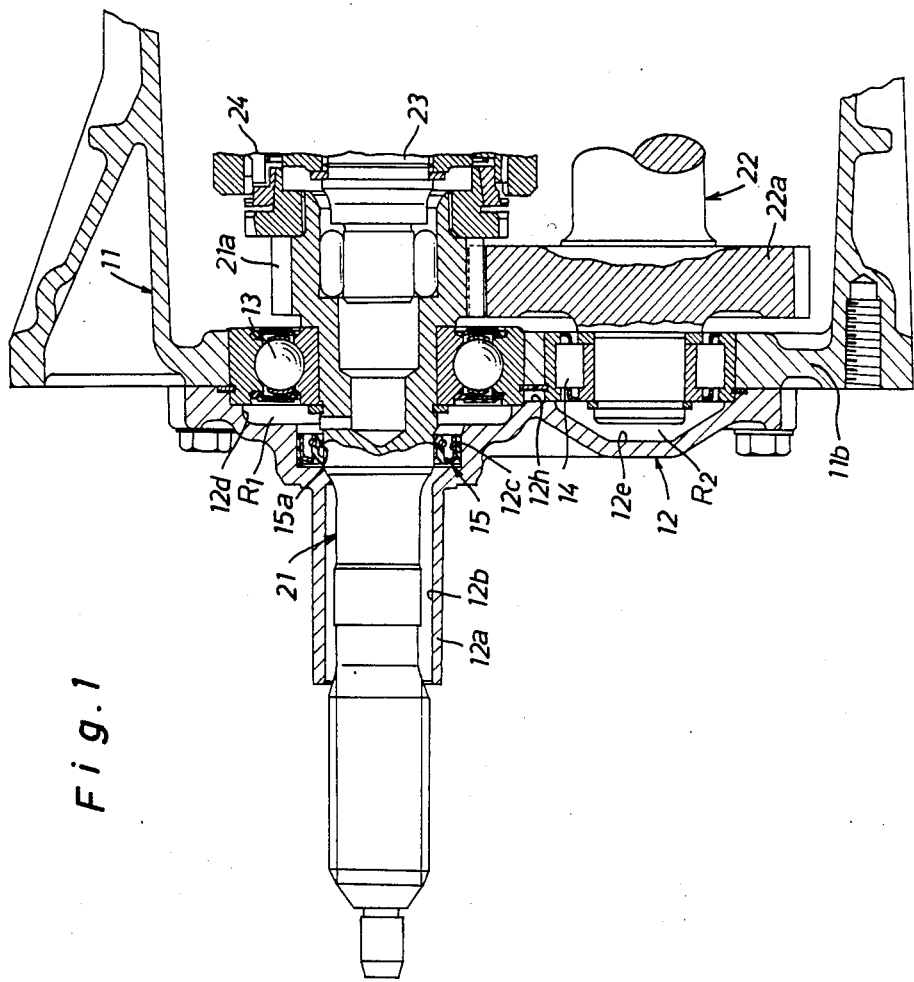
FIG. 1 is a sectional view of a change-speed gearing assembly in accordance with the present invention.

Referring now to the drawings, FIG. 1 illustrates a portion of a change-speed gearing assembly for motor vehicles which includes a casing 11 formed with an upright partition wall 11b and arranged to store an amount of lubricating oil therein, and a bearing retainer 12 secured in a fluid-tight manner to the outside face of partition wall 11b. Arranged within the casing 11 is an upper shaft in the form of an input shaft 21 which is supported by an upper sealed ball bearing 13 carried on the upper portion of partition wall 11b. An output shaft 23 is connected at its one end to the inner end of input shaft 21 for relative rotation therewith and is provided thereon with a synchronizer 24. A lower shaft in the form of a countershaft 22 is arranged in parallel with the input shaft 21 and supported at its one end by a lower roller bearing 14 carried on the lower portion of partition wall 11b. The input shaft 21 is integrally formed at its inner end with an input gear 21a, and the countershaft 22 is integrally formed with a counter gear 22a which is in meshing engagement with the input gear 21a at a position closely adjacent the inside face of partition wall 11b. The input and counter gears 21a and 22a act to pick up the lubricating oil in casing 11.

Figure 2:
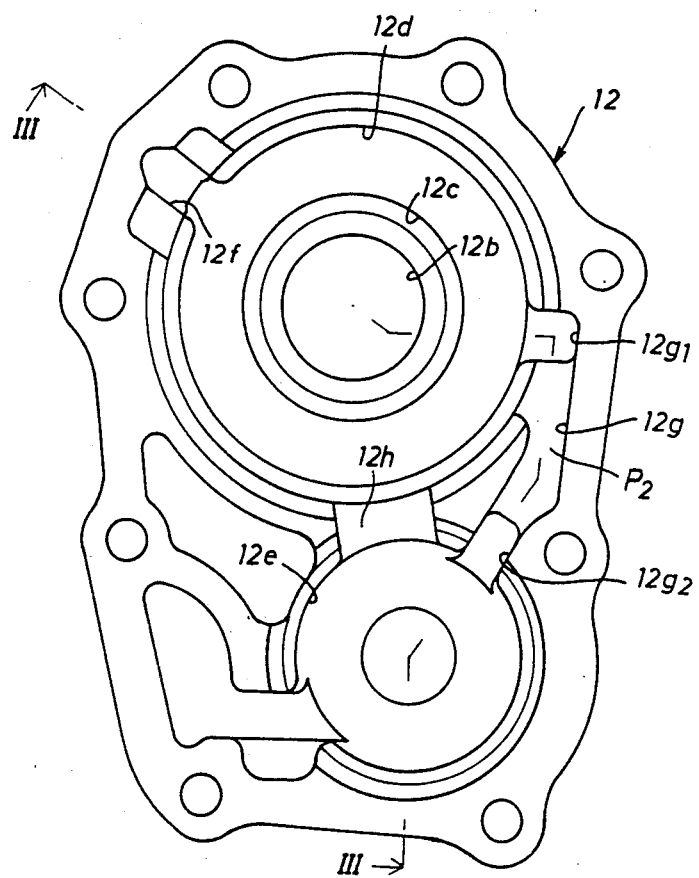
FIG. 2 illustrates the inside face of a bearing retainer shown in FIG. 1.
Figure 3:
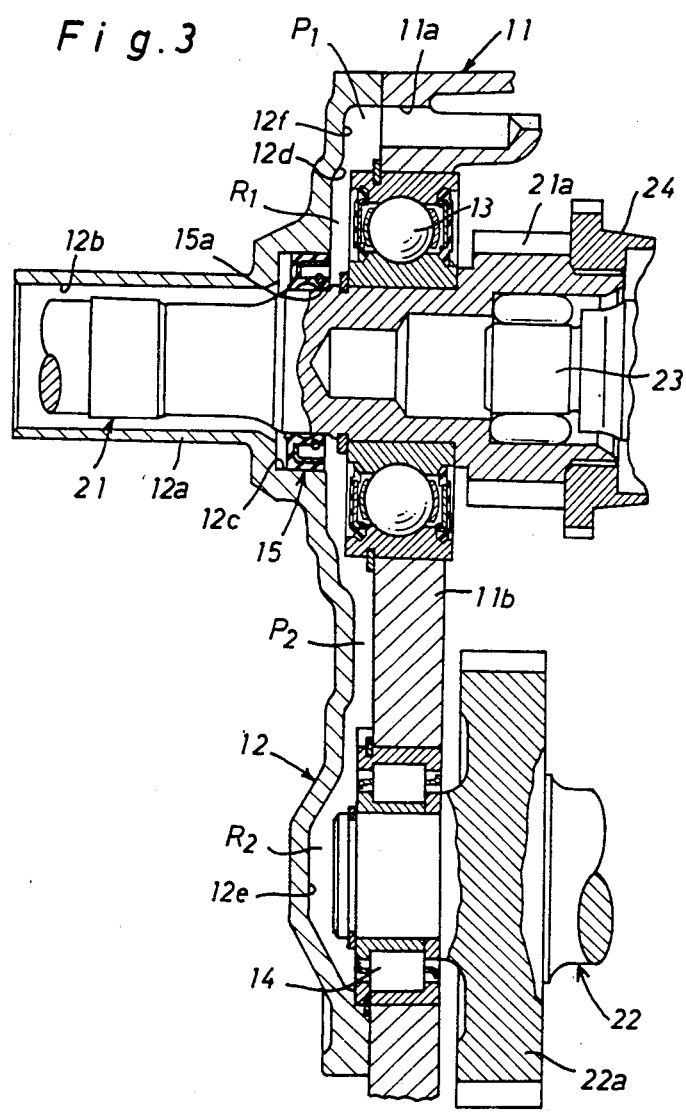
FIG. 3 is a sectional view of the change-speed gearing assembly taken along line III—III in FIG. 2.
Figure 4:
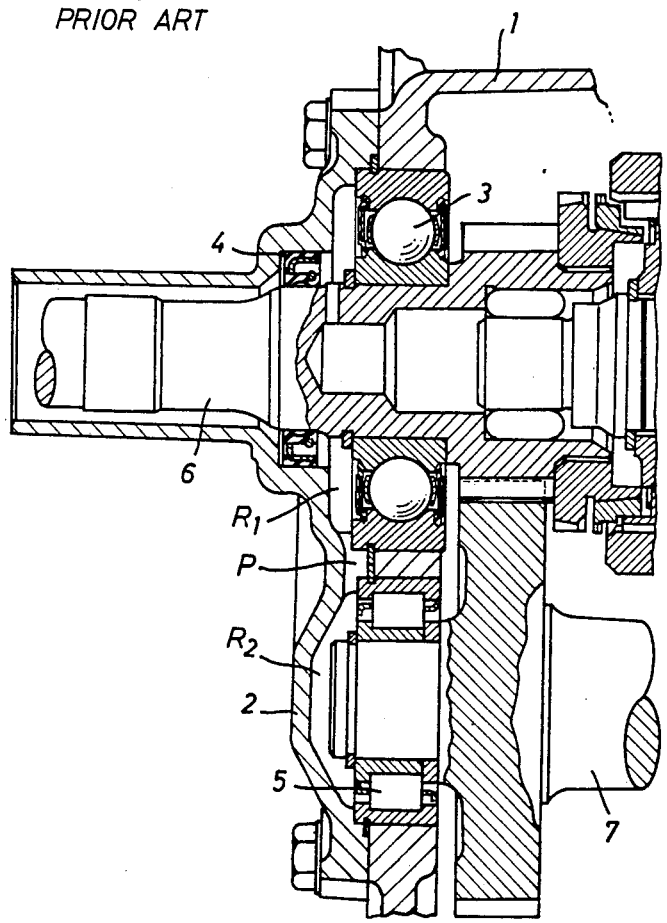
FIG. 4 is a sectional view of a conventional change-speed gearing assembly.

As can be well seen in FIGS. 1 and 2, the bearing retainer 12 has a tubular extension 12a arranged coaxially with the upper ball bearing 13 and is formed with an annular recess 12c at the inner end of an axial bore 12b in tubular extension 12a. An annular oil seal member 15 is coupled within the annular recess 12c with a press fit, and the input shaft 21 extends outwardly from the tubular extension 12a through an annular lip portion 15a of seal member 15 to be operatively connected in a usual manner to a prime mover of the vehicle through a frictional clutch (not shown). In such arrangement, the bearing retainer 12 is in abutment with respective outer races of the bearings 13 and 14 to retain them in place. As is illustrated in FIGS. 1 to 3, the bearing retainer 12 is formed at its upper portion with an upper annular cavity 12d of large diameter which cooperates with the outside face of upper sealed ball bearing 13 to form an upper annular lubrication chamber $R_1$ around the input shaft 21 between the upper bearing 13 and the oil seal member 15. Thus, the oil seal member 15 is exposed to the upper annular lubrication chamber $R_1$. The bearing retainer 12 is further formed at its lower portion with a lower circular cavity 12e of small diameter which cooperates with the outside face of lower roller bearing 14 to form a lower lubrication chamber $R_2$.

As can be well seen in FIG. 3, the upright partition wall 11b is provided therethrough with an axial hole 11a which opens at its inner end toward the interior of casing 11 and at its outer end into a radial recess 12f formed in the upper portion of bearing retainer 12 and located above the upper annular cavity 12d. The upright partition wall 11b is further formed at its inside face with an oil receiver which extends around the lower and side edges of the inner end opening of axial hole 11a to receive the lubricating oil picked up by rotation of the gears 21a, 22a and introduce it into the axial hole 11a. Thus, the radial recess 12f cooperates with the outside face of partition wall 11b to form an oil feed passage $P_1$ through which the lubricating oil from axial hole 11a flows into the upper lubrication chamber $R_1$.

In this embodiment, the change-speed gearing assembly is characterized in that as can be well seen in FIGS. 2 and 3, the bearing retainer 12 is formed at one side thereof with a vertical groove 12g which cooperates with the outside face of partition wall 11b to form a communication passage $P_2$ between the upper and lower lubrication chambers $R_1$ and $R_2$ and that the bearing retainer 12 is formed with an inner end face 12h which is fitted to the outside face of partition wall 11b to separate the bottom portion of upper annular cavity 12d from the upper portion of lower cavity 12e. The vertical groove 12g opens at its upper end 12$g_1$ into a side portion of the upper annular cavity 12d located substantially at the same level as the axis of input shaft 21 and opens at its lower end 12$g_2$ into the upper portion of lower cavity 12e. Thus, the upper opening of the communication passage $P_2$ is located above the lower edge of annular lip portion 15a of seal member 15 to permit a flow of lubricating oil overflowing from the upper lubrication chamber $R_1$ into the lower lubrication chamber $R_2$.

In operation of the change-speed gearing assembly, the lubricating oil in casing 11 is picked up by rotation of the gears 21a, 22a and splashes onto the surrounding parts. A portion of the picked up lubricating oil is received by the oil receiver and flows into the upper lubrication chamber $R_1$ through the oil feed passage $P_1$ to lubricate the upper ball bearing 13 and the oil seal member 15. Subsequently, a portion of the lubricating oil overflowing from the upper lubrication chamber $R_1$ flows into the lower lubrication chamber $R_2$ through the communication passage $P_2$ to lubricate the lower roller bearing 14 and returns into the bottom portion of casing 11 across the bearing 14. In such a condition, the level of oil in the upper lubrication chamber $R_1$ is constantly maintained above the lower edge of annular lip portion 15a of seal member 15. As a result, even if the quantity of lubricating oil fed into passage $P_1$ becomes small due to low speed rotation of the gears 21a, 22a, the oil seal member 15 is sufficiently lubricated at its lower portion.

Although a specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A change-speed gearing assembly for a motor vehicle comprising:
    a casing formed with an upright partition wall, said partition wall having an upper portion, a lower portion, an outside face and an inside face;
    a first sealed bearing having an outside face, said first bearing carried on the upper portion of said partition wall for rotatably supporting thereon an input shaft of said change-speed gearing assembly, said input shaft being provided thereon with an input gear adjacent the inside face of said partition wall;
    a second bearing having an outside face, said second bearing carried on the lower portion of said partition wall for rotatably supporting thereon a counter-shaft of said change-speed gearing assembly, said countershaft being provided thereon with a counter gear in mesh with said input gear;
    a bearing retainer secured in a fluid-tight manner to the outside face of said partition wall to retain both said bearings in place, said bearing retainer having therein an opening coaxial with said first bearing through which said input shaft extends outwardly and being formed with upper and lower cavities which cooperate with the respective outside faces of said first and second bearings to form upper and lower lubrication chambers; and
    an annular seal member coupled with the opening of said bearing retainer in surrounding relationship with said input shaft to seal said upper lubrication chamber, and wherein said partition wall is formed in its upper portion with an axial hole, said axial hole opening at an inner end toward the interior of said casing above said input gear and at an outer end into the upper portion of said upper lubrication chamber;
    the improvement comprising said bearing retainer formed with an inner end face fitted to the outside face of said partition wall to separate a bottom portion of said upper cavity from an upper portion of said lower cavity, and wherein said bearing retainer is further formed at one side thereof with a vertical groove having an upper end opening into a side portion of said upper cavity located above a lower edge of said seal member and a lower end opening into the upper portion of said lower cavity.

2. A change-speed gearing assembly as claimed in claim 1, wherein said upper cavity in said bearing retainer is an annular cavity coaxial with said first bearing, and said lower cavity in said bearing retainer is a circular cavity coaxial with said second bearing, the diameter of said upper annular cavity being larger than that of said lower circular cavity.

3. A change-speed gearing assembly as claimed in claim 1, wherein said partition wall is formed at its inside face with an oil receiver extending around lower and side edges of the inner end opening of said axial hole to receive lubricating oil picked up by rotation of said gears and supply it into said upper lubrication chamber through said axial hole.

4. A change-speed gearing assembly as claimed in claim 1, wherein said first bearing is in the form of a sealed ball bearing arranged to store an amount of lubricating oil in said upper lubrication chamber, and said second bearing is in the form of a roller bearing arranged to permit a flow of lubricating oil thereacross from said lower lubrication chamber into the interior of said casing.

* * * * *